Figures 1, 2, 3:
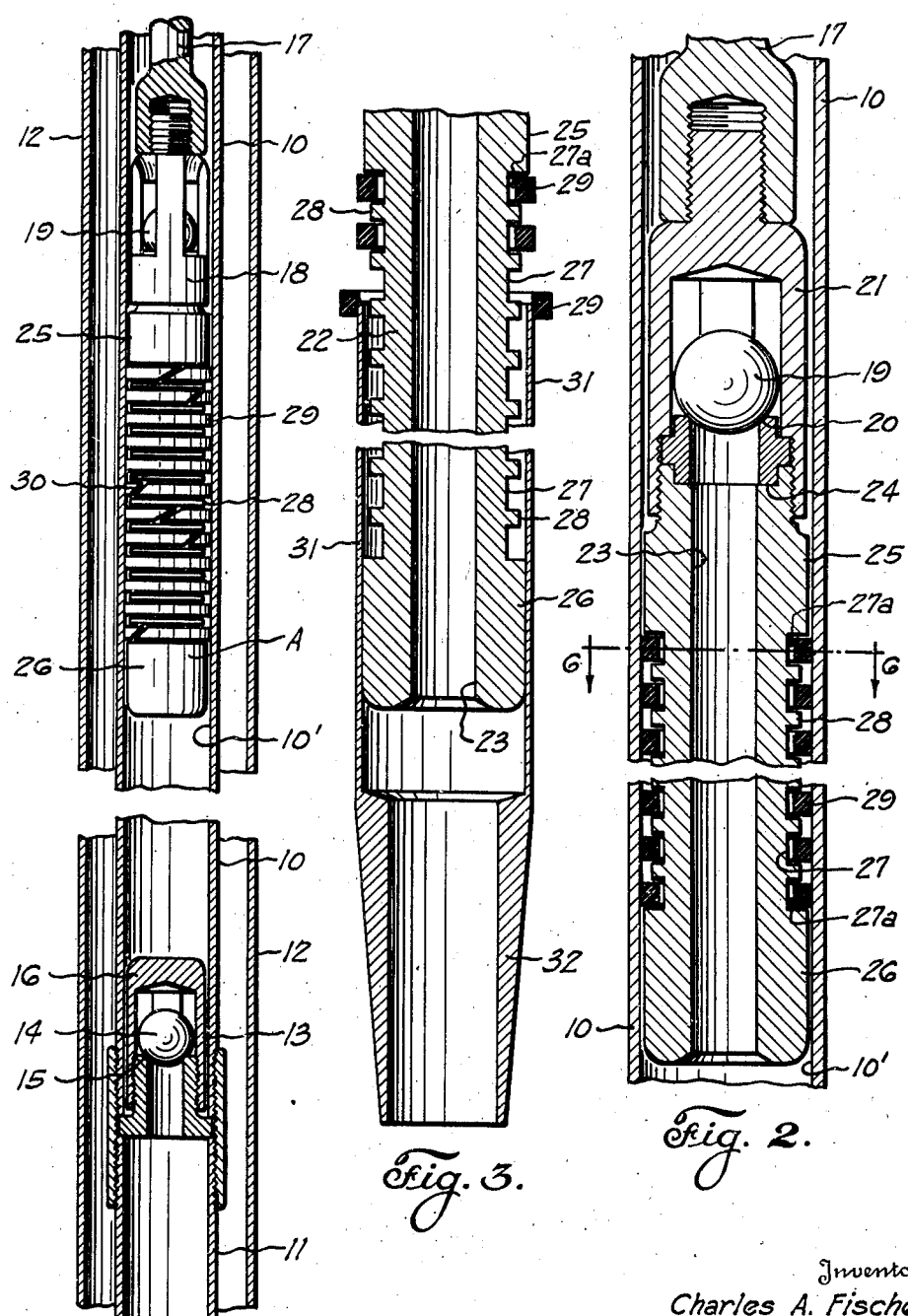

March 21, 1944.  C. A. FISCHER ET AL  2,344,687
PUMP PLUNGER
Filed Oct. 30, 1939  2 Sheets-Sheet 1

Inventors
Charles A. Fischer
Dixon T. Harbison
Charles A. Mercer

By
Jack A. Ashley
Attorney

March 21, 1944.    C. A. FISCHER ET AL    2,344,687
PUMP PLUNGER
Filed Oct. 30, 1939      2 Sheets-Sheet 2
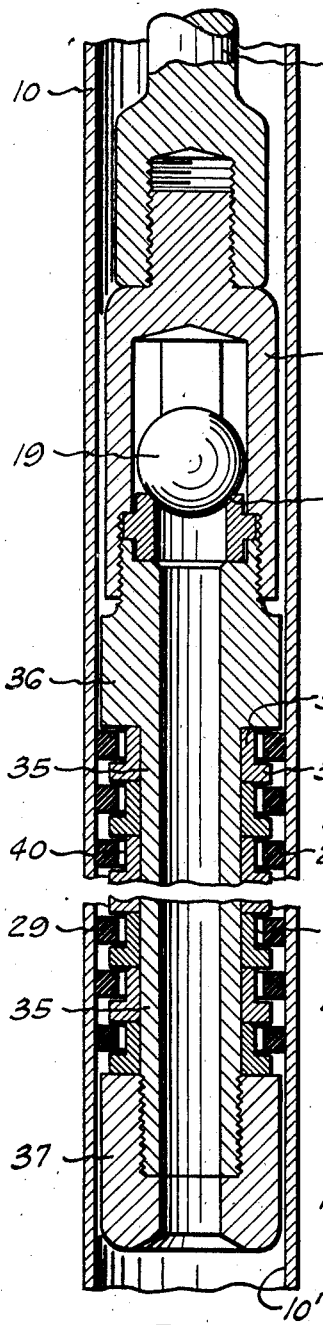
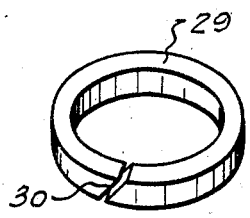
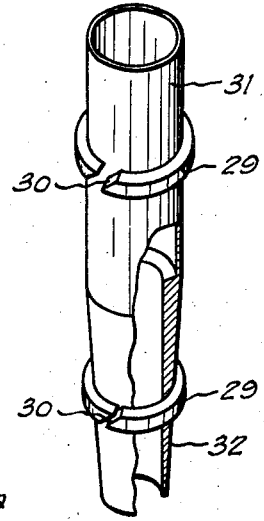
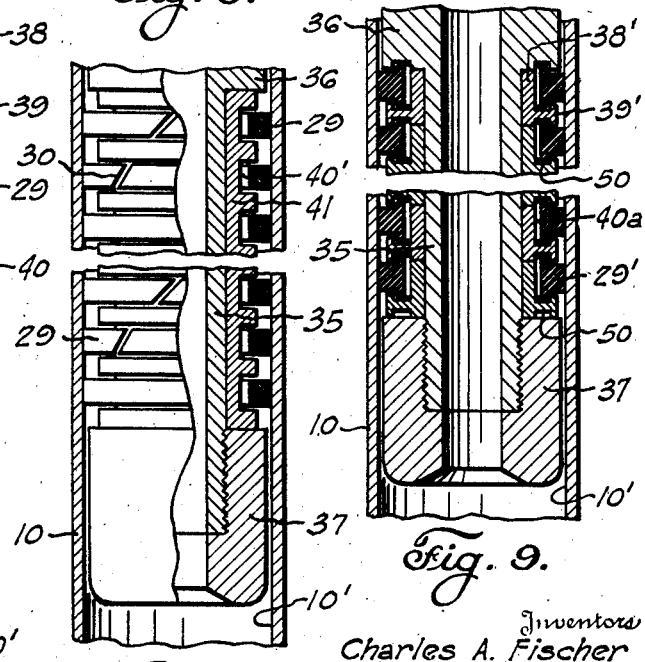
Inventors
Charles A. Fischer
Dixon T. Harbison
Charles A. Mercer
Attorney Patented Mar. 21, 1944

2,344,687

UNITED STATES PATENT OFFICE 2,344,687

PUMP PLUNGER

Charles A. Fischer and Dixon T. Harbison, Fort Worth, and Charles A. Mercer, Hawley, Tex.

Application October 30, 1939, Serial No. 301,972

5 Claims. (Cl. 309—23)

This invention relates to new and useful improvements in pump plungers.

One object of the invention is to provide an improved plunger which is particularly adapted for use in well pumps for lifting well fluids to the surface, although it may be used in other pump cylinders.

An important object of the invention is to provide an improved pump plunger which is so constructed that its outer sealing surface is yieldable laterally within certain limits, whereby said surface may readily conform to, and maintain contact with, the cylinder bore throughout reciprocation of the plunger, thereby eliminating leakage due to irregularities on the cylinder bore or due to said bore being crooked or axially offset from alinement with the plunger.

Another object of the invention is to provide an improved pump plunger having a plurality of sealing rings mounted thereon in such manner that small particles of sand, grit and other extraneous matter can be by-passed around said rings, whereby "sanding up" of the plunger is eliminated.

A particular object of the invention is to provide an improved plunger having a plurality of sealing rings mounted thereon, each ring being capable of a limited vertical movement with relation to the plunger body, whereby a slippage of fluid past the plunger is permitted each time that the direction of movement of the plunger occurs, whereby the reversal of stresses, occasioned by the reversal of the movement of the plunger, is gradually imposed on the pump rods, thereby eliminating the imposition of a sudden or abrupt load on said rods, which not only increases the life of the working parts but makes for a smoother and more efficient operation.

A further object of the invention is to provide an improved pump plunger, of the character described, wherein a plurality of split sealing rings are mounted in grooves formed on the plunger, each ring having a loose fit in its groove, whereby it may undergo limited lateral and vertical movement therein and also whereby the outer diameter of said ring may be reduced or enlarged to conform to the bore of the pump cylinder.

A still further object of the invention is to provide an improved pump plunger wherein the sealing rings are locked on the plunger against radial displacement therefrom, whereby danger of the rings being dismounted by hanging on or striking the couplings, or other projections, of the tubing during "running" or lowering of the plunger through the well tubing, is obviated.

Still another object of the invention is to provide an improved plunger having its sealing rings constructed of a material, such as "Bakelite" impregnated with graphite, whereby the rings have lubricating, as well as sealing, qualities.

Another object of the invention is to provide an improved method of and means for readily mounting the split sealing rings within their respective grooves on the plunger body, whereby assembly of the device is facilitated.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a view, partly in elevation and partly in section, of a plunger, constructed in accordance with the invention and illustrating the same mounted within the usual working barrel of a well fluid pump, Figure 2 is an enlarged, vertical, sectional view of said plunger, Figure 3 is a transverse, vertical, sectional view of the lower portion of the plunger and of the sleeve which is utilized to mount the sealing rings on said plunger, Figure 4 is an isometric view of the sleeve, illustrating the method of passing the rings thereover, Figure 5 is an isometric view of one of the sealing rings, Figure 6 is a horizontal, cross-sectional view, taken on the line 6—6 of Figure 2, Figure 7 is a view, similar to Figure 2, of a slightly modified form of the invention, Figure 8 is a view, partly in elevation and partly in section, showing still another form of the invention, and Figure 9 is a view, similar to Figure 8 illustrating another modification of the invention.

In the drawings, the numeral 10 designates the usual working barrel of a well fluid pump, which barrel is connected in the tubing string 11 in the usual manner. The tubing string and working barrel are disposed axially within the usual well casing 12. A standing valve 13 which includes a ball 14, seat 15 and cage 16 is suitably mounted within the lower end of the working barrel in the usual manner. The well fluids are adapted to flow upwardly through the well tubing 11 and to unseat the ball 14, after which said fluids enter the lower end of the working barrel.

In carrying out the invention, the improved pump plunger A is adapted to reciprocate within the bore 10' of the working barrel 10. The plunger has its upper end connected to the usual pump rods 17, whereby when the rods are moved vertically within the well tubing the plunger A is reciprocated within the working barrel. The upper end of the plunger has the usual travelling valve 18 thereon and this valve includes the ball 19, seat 20 and cage 21. On the upstroke of the plunger A, the ball 19 is seated, whereby the fluid above said plunger is lifted through the well tubing string. At this time, the suction created below the plunger A unseats the ball 14 of the standing valve 13 and the well fluids are drawn from the formation into the lower end of the working barrel 10. Upon the downstroke of the plunger, the fluid within the working barrel serves to seat the ball 14 and also acts to unseat the ball 19 of the travelling valve, whereby during the downstroke, the well fluid may by-pass through the bore of the plunger and enter the well tubing thereabove. Upon the next successive upstroke of the plunger, these well fluids are lifted to the surface. This operation of the plunger is the usual practice in well fluid pumps and forms no part of the present invention.

The plunger A includes an elongate, tubular body 22, which is provided with an axial bore 23 extending entirely therethrough. The upper end of the plunger is recessed at 24 to receive the valve seat 20 of the travelling valve 18 and the upper portion of the plunger is externally screw-threaded, whereby the cage 21 may be screwed thereon to retain the seat in position, as is clearly shown in Figure 2. Below the external screw threads at the upper portion of the plunger, the plunger body is enlarged to provide an enlarged collar 25. The extreme lower portion of the plunger body is similarly enlarged to provide a collar 26. Between the collars 25 and 26, the external surface of the plunger body is formed with a plurality of annular grooves 27, which grooves are spaced equidistant from each other vertically of the plunger. The provision of the grooves provides a plurality of external, annular flanges 28, which flanges are disposed between the grooves. It is noted that the outer peripheral surfaces of the flanges 28 are offset inwardly in a vertical plane, from the external surfaces of the collars 25 and 26.

A split sealing ring 29 is disposed within each groove 27 and, as is clearly shown in Figure 5, each ring has its ends or extremities bevelled or inclined, as indicated at 30. The provision of the bevelled portion makes it possible for the ring to be reduced in diameter after it is in position within its respective groove. Each ring is substantially rectangular in cross-section and has a height which is less than the vertical height of the groove 27, whereby the ring may undergo a limited vertical movement within its groove. The width of each ring is less than the distance from the base of the groove to the bore 10' of the working barrel, whereby each ring may undergo a limited lateral movement within its groove. Thus, it will be obvious that each ring may undergo limited lateral, as well as vertical, movement within its groove and, in addition, said ring may be expanded or contracted in diameter, due to its being split.

The rings 27 are constructed of a material having an inherent elasticity and the normal diameter of said rings is such that the outer peripheries thereof snugly engage the bore 10' of the working barrel, whereby said rings serve to seal against the bore. Although any suitable material may be employed for constructing the rings 29, it has been found that "Bakelite" impregnated with graphite is exceptionally satisfactory. This is true because such material is not affected by the fluids in the well and also has certain lubricating qualities. This material also has sufficient inherent elasticity to maintain a constant contact with the bore of the cylinder or working barrel 10. Therefore, in the event that an irregularity may occur in said bore, or in the event that the bore is crooked or offset axially, the rings 29 will automatically follow the surface of said bore so as to maintain the sealing contact therewith.

The rings 29 may be placed within their respective grooves 27 in any suitable manner, but in Figures 3 and 4 a particular method, which facilitates the assembly, is illustrated. An elongate sleeve 31 is adapted to be engaged over one end of the plunger, prior to the rings 29 being mounted in their respective grooves. The lower portion of the sleeve 31 is tapered inwardly, as shown at 32. In placing the rings within their respective grooves, the sleeve is engaged over the plunger and its upper end is alined with the groove into which the ring is to be placed. The ring is then slid onto the tapered portion 32 of the sleeve 31. Due to the taper, the ring is expanded as it is moved upwardly on the sleeve, as is clearly shown in Figure 4. The ring is moved throughout the length of the sleeve and, as it slides off of the upper end thereof, it snaps into the groove 27 of the plunger body. The use of the sleeve 31 makes it possible to quickly locate and mount the rings 29 within their respective grooves, whereby the assembly of the plunger is facilitated.

In the operation of the plunger, assuming the plunger to be at the lower end of its stroke, the fluid load is above said plunger. At this time, all of the rings 29 are at the lower ends of their respective grooves 27, resting on the flanges 28 between said grooves. This causes a space between the upper end of each ring and the flange 28 immediately thereabove, whereby a limited flow through this space may occur. Of course, the outer periphery of each ring 29 is engaging the bore 10' of the working barrel, whereby a space 27a (Figure 2) is present between the inner surface of the ring and the base of its groove.

Manifestly, as the plunger moves upwardly during the upstroke, the fluid thereabove is lifted upwardly in the tubing string. A limited flow of fluid may occur downwardly past the top of the uppermost ring 29 and into the annular space 27a between the ring and its groove. From this annular space, the fluid may flow through the slit or opening between the ends 30 of said rings and downwardly onto the next ring. Upon striking the next ring, the fluid may flow into the annular space 27a behind this ring and then through the slit between the extremities of the ring to the next below ring. In this manner, a limited amount of fluid may work its way downwardly through the rings 29 and grooves 27. This flow serves to carry any sand, grit or other extraneous matter which may accumulate within the grooves therefrom, with the result that such extraneous matter will not interfere with the operation of the plunger, which is kept clean at all times.

If the bore of the working barrel 10 should be crooked or offset axially out of alinement with the plunger A, or if said bore should have any irregularities therein, it will be obvious that the rings 29 will automatically expand or contract to compensate for such irregularity. The expansion and contraction of the rings is permitted due to the bevelled extremities 30 of each ring, as well as the space 27a behind each ring. Therefore, the rings automatically conform to, and maintain sealing contact with, the bore 10' and regardless of the irregularities on said bore, there is substantially no leakage past the plunger. In addition to being capable of changing their diameter, the rings 29 may undergo a limited lateral movement with relation to the plunger so as to further take care of irregularities in the bore.

As the plunger A reaches the upper end of its upstroke, the movement of said plunger is halted and the downstroke is begun. As has been explained, the rings 29 are at the lower end of their respective grooves during the upward movement of the plunger due to the fluid load thereabove. As the downstroke is begun, the plunger is relieved of the load acting downwardly thereon and a load is imposed against the lower end of said plunger due to the fluid within the working barrel 10 through which said plunger moves. The fluid within the working barrel will, of course, act against the underside of the sealing rings 29 and will first strike the lowermost ring to cause said ring to move upwardly within its groove into engagement with the flange 28 immediately above said ring. After the first ring has been shifted within its groove due to the change in the direction of movement of the plunger, the other rings will be successively shifted in their respective grooves until all of said rings are engaging the top of said groove. With this arrangement, the rings 29 are successively shifted as the load on the plunger is shifted. The rings do not shift simultaneously but rather in stepped order beginning from the lowermost ring to the topmost ring. During the time that the rings are undergoing this shifting movement, a slippage of the fluid past the plunger occurs and this slippage prevents a sudden or abrupt shock or stress to be imposed upon the pump rods 17, with the result that a smoother action is had as the movement of the plunger is changed. Of course, when the plunger reaches the lower end of its downstroke and begins its upstroke, the rings 29 are again successively shifted in the manner described, whereby slippage again occurs. Therefore, each time the direction of the plunger is changed, the shifting of the rings allowing slippage occurs, whereby the reversal of the stresses in the operation will be taken gradually by the rods. This eliminates the sudden imposition of a load on said rods and increases the life thereof.

From the above, it will be seen that the arrangement provides for a smoother and more efficient lifting of the well fluids. The clearance between the sealing rings 29 and their respective grooves automatically compensates for any irregularity in the bore 10' of the working barrel, whereby leakage of fluid past the plunger is reduced to a minimum. The clearances between said rings and their respective grooves also provide for a self-cleaning plunger which prevents the accumulation of sand, grit or other extraneous matter which might interfere with the operation of the plunger.

In Figure 7, a slightly modified form of the invention is shown. In this form, the body of the plunger comprises a tubular mandrel 35 having an enlarged head 36 formed at its upper end. The upper portion of the head 36 is reduced and externally screw-threaded to receive the valve cage 21. The lower end of the tubular mandrel is provided with external screw threads which receive a collar 37. A plurality of flanged spacer rings 38 surround the mandrel 35 and are confined between the underside of the head 36 and the collar 37. As is clearly shown in Figure 7, each spacer ring 38 has an external flange 39 at its lower end and, when said rings are superimposed on the mandrel 35, the spaces between the flanges 39 of said rings form annular grooves 40, which grooves are comparable to the grooves 27 in Figure 2. The sealing rings 29 are mounted in the grooves 40 in the same manner as said rings were mounted in the grooves 27, hereinbefore described. The operation of this form of the invention is substantially the same as the operation of the form shown in Figures 1 to 6. Since the spacer rings 38 are separate from each other and are arranged to be slid over the mandrel 35, it will be manifest that the assembly of this plunger does not necessitate the use of the elongate sleeve 31. In this form, the mandrel 35 may be made of any desired length, whereby any desired number of rings 29 may be employed.

In Figure 8, still another form of the invention is shown, wherein an outer sleeve 41 is arranged to be substituted for the plurality of spacer rings 38. This sleeve encircles the mandrel 35 and is confined between the head 36 and the retaining collar 37. The external surface of the sleeve 41 is formed with a plurality of annular grooves 40' which are spaced throughout the vertical length thereof. The grooves 40' are similar to the grooves 40 in the form shown in Figure 7 and to the grooves 27 in the form shown in Figures 1 to 6. The grooves 40' are adapted to receive the sealing rings 29. Manifestly, the operation of this form is the same as has been described.

It has been found that in some instances, when the pump plunger is lowered or raised through the well tubing, the rings 29 may strike and hang on the tubing couplings or other projections within the tubing bore, with the result that said rings may be stripped from their grooves. Such stripping is caused by the outward radial displacement of the ring from the groove and to obviate this possibility, the construction shown in Figure 9 may be employed. This form of the device is similar to the form illustrated in Figure 7 and a plurality of superposed spaced collars 38' are mounted on the mandrel 35. The flange 39' of each ring has annular recesses or grooves 50 formed in its top and bottom and manifestly, when the spacers are in position on the mandrel, the recesses, together with the space between the flanges of adjacent collars form substantially T-shaped grooves 40a. T-shaped rings 29' are mounted in the grooves 40a and have sufficient clearance to undergo a limited lateral and vertical movement. The operation of the plunger and rings is the same as the other forms, hereinbefore described. It is noted that the use of the T-shaped grooves and rings prevents the outward radial displacement of the rings, whereby said rings cannot be stripped from the supporting mandrel.

In all forms of the invention, the sealing rings 29 have a relatively loose fit within their respective grooves, whereby they may undergo a limited lateral and vertical movement. The sealing rings are split so that expansion and contraction of said rings to change the diameter thereof may be automatically accomplished. Although it is preferable that the rings be made of an oil-resisting material having sufficient elasticity to perform the function as described, it is pointed out that said rings could be made of other material, as for example, metal.

The foregoing description of the invention is explanatory thereof and various changes in the size, shape and materials, as well as in the details of the illustrated construction, may be made, within the scope of the appended claims, without departing from the spirit of the invention.

What we claim and desire to secure by Letters Patent is:

1. A reciprocatory pump plunger including a tubular body member formed to provide a pair of spaced axially alined head members connected by a reduced intermediate portion, means providing a plurality of uniformly spaced circumferentially extending spacer members carried by said reduced portion so as to provide a plurality of uniformly spaced grooves between said head members, and a resilient split packing member loosely disposed about said reduced portion in each of said grooves and having an open gap when in cylinder contacting position, each of said packing members in extreme contracted position having an internal diameter substantially greater than the external wall defining the base of its corresponding groove, and having a width along its longitudinal axis substantially less than the width of the groove between the opposed side walls of adjacent spacer members, the space between the internal wall of the packing member and the base of the groove being substantially equal to the space between the sides of the packing member and the side walls of the groove, whereby each of said packing members in either its expanded or contracted position will have substantial freedom of movement parallel to the longitudinal and transverse axes of the body member, so that each of said packing members will support a portion of the load imposed upon the plunger and will simultaneously permit a progressively lessening slippage of fluid and extraneous matter between said packing members and spacer members from one end of the body member toward the other end thereof in a reverse direction with respect to the movement of the plunger during normal reciprocatory motion of the latter within a cylinder so as to materially lessen the shock and consequent stresses and strains thereon incident to reversing the direction of travel of said plunger.

2. A reciprocatory pump plunger including a tubular body member formed to provide a pair of spaced axially alined head members connected by a reduced intermediate portion, a plurality of uniformly spaced circumferentially extending spacer members carried by said reduced portion so as to provide a plurality of uniformly spaced grooves between said head members, the external diameters of the spacer members being substantially equal to each other but substantially less than the external diameters of said head members, and a resilient split packing member loosely disposed about said reduced portion in each of said grooves and having an open gap when in cylinder contacting position, each of said packing members in extreme contracted position having an internal diameter substantially greater than the external wall defining the base of its corresponding groove, and having a width along its longitudinal axis substantially less than the width of the groove between the opposed side walls of adjacent spacer members, the space between the internal wall of the packing member and the base of the groove being substantially equal to the space between the sides of the packing member and the side walls of the groove, whereby each of said packing members in either its expanded or contracted positions will have substantial freedom of movement parallel to the longitudinal and transverse axes of the body member, so that each of said packing members will support a portion of the load imposed upon the plunger and will simultaneously permit a progressively lessening slippage of fluid and extraneous matter between said packing members and spacer members from one end of the body member toward the other end thereof in a reverse direction with respect to the movement of the plunger during normal reciprocatory motion of the latter within a cylinder so as to materially lessen the shock and consequent stresses and strains thereon incident to reversing the direction of travel of said plunger.

3. A reciprocatory pump plunger including a tubular body member formed to provide a pair of spaced axially alined head members connected by a reduced intermediate portion, a detachable sleeve member conformably fitting the reduced intermediate portion of the body member, a plurality of uniformly spaced circumferentially extending spacer members carried by said sleeve member so as to provide a plurality of uniformly spaced grooves between said head members, and a resilient split packing member loosely disposed about said sleeve member in each of said grooves and having an open gap when in cylinder contacting position, each of said packing members in extreme contracted position having an internal diameter substantially greater than the external wall defining the base of its corresponding groove, and having a width along its longitudinal axis substantially less than the width of the groove between the opposed side walls of adjacent spacer members, the space between the internal wall of the packing member and the base of the groove being substantially equal to the space between the sides of the packing member and the side walls of the groove, whereby each of said packing members in either its expanded or contracted position will have substantial freedom of movement parallel to the longitudinal and transverse axes of the body member, so that each of said packing members will support a portion of the load imposed upon the plunger and will simultaneously permit a progressively lessening slippage of fluid and extraneous matter between said packing members and spacer members from one end of the body member toward the other end thereof in a reverse direction with respect to the movement of the plunger during normal reciprocatory motion of the latter within a cylinder so as to materially lessen the shock and consequent stresses and strains thereon incident to reversing the direction of travel of said plunger.

4. A reciprocatory pump plunger including a tubular body member formed to provide a pair of spaced axially alined head members connected by a reduced intermediate portion, a plurality of uniformly spaced circumferentially extending spacer members carried by said reduced portion so as to provide a plurality of uniformly spaced grooves between said head members, a resilient split packing member loosely disposed about said reduced portion in each of said grooves and having an open gap when in cylinder contacting position, each of said packing members in extreme contracted position having an internal diameter substantially greater than the external wall defining the base of its corresponding groove, and having a width along its longitudinal axis substantially less than the width of the groove between the opposed side walls of adjacent spacer members, the space between the internal wall of the packing member and the base of the groove being substantially equal to the space between the sides of the packing member and the side walls of the groove, and means formed on each of a pair of said spacer members for engaging and interlocking with a packing member disposed therebetween so as to prevent separation between the body member and packing members while permitting substantial relative movement therebetween, whereby each of said packing members in either its expanded or contracted position will have substantial freedom of movement parallel to the longitudinal and transverse axes of the body member, so that each of said packing members will support a portion of the load imposed upon the plunger and will simultaneously permit a progressively lessening slippage of fluid and extraneous matter between said packing members and spacer members from one end of the body member toward the other end thereof in a reverse direction with respect to the movement of the plunger during normal reciprocatory motion of the latter within a cylinder so as to materially lessen the shock and consequent stresses and strains thereon incident to reversing the direction of travel of said plunger.

5. A reciprocatory pump plunger including a tubular body member formed to provide a pair of spaced axially alined head members connected by a reduced intermediate portion, a plurality of uniformly spaced circumferentially extending spacer members carried by said reduced portion so as to provide a plurality of uniformly spaced grooves between said head members, a resilient split packing member loosely disposed about said reduced portion in each of said grooves and having an open gap when in cylinder contacting position, each of said packing members in extreme contracted position having an internal diameter substantially greater than the external wall defining the base of its corresponding groove, and having a width along its longitudinal axis substantially less than the width of the groove between the opposed side walls of adjacent spacer members, the space between the internal wall of the packing member and the base of the groove being substantially equal to the space between the sides of the packing member and the side walls of the groove, each of said adjacent spacer members being provided with an inwardly extending flange spaced from and cooperating with the opposed flange of the adjacent spacer member for engagement with a packing member disposed therebetween so as to prevent separation between the body member and packing members, whereby each of said packing members in either its expanded or contracted position will have substantial freedom of movement parallel to the longitudinal and transverse axes of the body member, so that each of said packing members will support a portion of the load imposed upon the plunger and will simultaneously permit a progressively lessening slippage of fluid and extraneous matter between said packing members and spacer members from one end of the body member toward the other end thereof in a reverse direction with respect to the movement of the plunger during normal reciprocatory motion of the latter within a cylinder so as to materially lessen the shock and consequent stresses and strains thereon incident to reversing the direction of travel of said plunger.

CHARLES A. FISCHER.
DIXON T. HARBISON.
CHARLES A. MERCER.